(12) United States Patent
Beiser

(10) Patent No.: US 7,086,315 B1
(45) Date of Patent: Aug. 8, 2006

(54) STRADDLE-CUTTING TOOL

(76) Inventor: Randy Beiser, 15399 Oakwood Dr., Romulus, MI (US) 48174

(*) Notice: Subject to any disclaimer, the term of this patent is extended or adjusted under 35 U.S.C. 154(b) by 121 days.

(21) Appl. No.: 10/945,059

(22) Filed: Sep. 20, 2004

(51) Int. Cl.
*B23B 3/00* (2006.01)

(52) U.S. Cl. .................... 82/112; 82/54; 82/56; 82/99.1
(58) Field of Classification Search ................ 82/112, 82/54, 56, 99.1, 133, 137
See application file for complete search history.

(56) References Cited

U.S. PATENT DOCUMENTS

| 3,327,386 A | * | 6/1967 | Jerue | 483/34 |
| 3,442,164 A | * | 5/1969 | Blazek | 82/117 |
| 4,034,647 A | * | 7/1977 | Hoglund | 409/221 |
| 4,138,926 A | * | 2/1979 | Hoglund | 409/297 |
| 4,452,111 A | * | 6/1984 | Anderson | 82/112 |
| 5,499,563 A | * | 3/1996 | Hansen | 82/112 |

* cited by examiner

*Primary Examiner*—Willmon Fridie, Jr.
(74) *Attorney, Agent, or Firm*—Charles W. Chandler

(57) ABSTRACT

A straddle-cutting device for machining a pair of parallel surfaces on a rotating workpiece in a single cut as the cutting tool is advanced over the workpiece.

Apparatus is provided for biasing the cutting tools using a stack of spring washers and a pneumatic power cylinder.

10 Claims, 3 Drawing Sheets

STRADDLE-CUTTING TOOL

BACKGROUND AND SUMMARY OF THE INVENTION

This invention is related to straddle-cutters, that is, apparatus for cutting two parallel surfaces on opposite sides of a workpiece in a single cut. Two side cutters spaced at a precise distance, machine the two sides of the workpiece simultaneously. For example, brake rotors are machined in this manner. Usually commercial forms of such a device use hydraulic power for moving the cutters into and out of position.

The broad purpose of the present invention is to provide an improved straddle-cutting apparatus using pneumatic power, and a combination of Belleville springs.

Currently industry uses hydraulic fluid/air over hydraulic fluids to actuate piston/cylinders to extend and retract a straddle-cutting tool. Filters, valves, and piping fittings are required to move the fluids and produce the necessary pressures to activate hydraulic piston and cylinders. As the cutting force is applied to the workpiece, a reactionary force in the other direction acts upon the cutters. Liquids have the nature to drift or collapse under applied pressures. Consistencies for dimensional control may be compromised in quality for statistical process controls.

Hydraulic vessels run higher-pressure levels and response times than mechanical advantage devices. Hydraulics used for this application also requires programmed timing for the response.

The preferred embodiment of the invention employs a pair of cutting tools spaced on opposite sides of the cutting position of a workpiece. At least one of the cutting tools is movable toward one face of the workpiece for a cutting motion and then retracted by a pneumatic cylinder. An axially movable shaft moves the cutting tool. The pneumatic cylinder moves a lever to move the shaft to retract the tool. A stack of Belleville washers, mounted around the shaft, return the shaft to extend the cutting tool.

The preferred straddle-cutter provides several advantages over the prior art. It provides a cleaner work environment, and reduces areas for potential hydraulic leaks by eliminating the use of hydraulic oil. The preferred apparatus requires fewer tubular piping and connections, fewer pressure fittings and reduces service calls. The preferred apparatus functions in a factory using industry standard air pressure. No new pressures or factory installations are required. The manufacturer sets the standard of air pressure utilized at the cutter by stamping the requirements directly into the housing.

The mechanical advantage is more reliable because direct mechanical contacts between the internal mechanical devices are used. There are no internal leaks or slippage. A manufacturing advantage exists because reliable product quality is available through reliable management and reduction of the equipment down time. The product holds product dimensions, harmonic surfaces and run-outs to industry standards. Presetting the tooling lends to industry, "lean manufacturing".

All external components and details attached to the cutter housing are industry standard items, allowing the user to comparatively shop for replacements, and to develop its own inventories of spare parts based upon usage. The products internal design focuses against the various backlashes, and deflections in loadings produced in manufacturing by engineering their details and assemblies to directly access the linear and axial movements associated with resultant forces.

Further advantages are that the preferred straddle-cutter provides the ability to consistently return the cutting tool to the material-removal position. Programming and response time are eliminated, allowing for more product manufactured per work shift. The cutter can maintain a constant force despite changes in a mechanical system resulting from wear, relaxation or thermal change.

At rest, the cutting tool is in the closed, material-removal position. Proper product dimensional control is given to the machinist in an external, manually controlled turning cartridge capable of maintaining relatively small positional tolerances. The cartridge can be adjusted rather than the entire tool. This rest position may also be gaged for final dimensional manufacturing size by the finished product.

When clean air is supplied, the tool opens to a clearance position unable to cut or remove material. This enables the cutter housing holding the cutters to retract back to a home position without causing damage to the finished product surface. At this point, the finished product is unloaded and the next unfinished product is loaded.

Still further objects and advantages of the invention will become readily apparently to those skilled in the art to which the invention pertains, upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
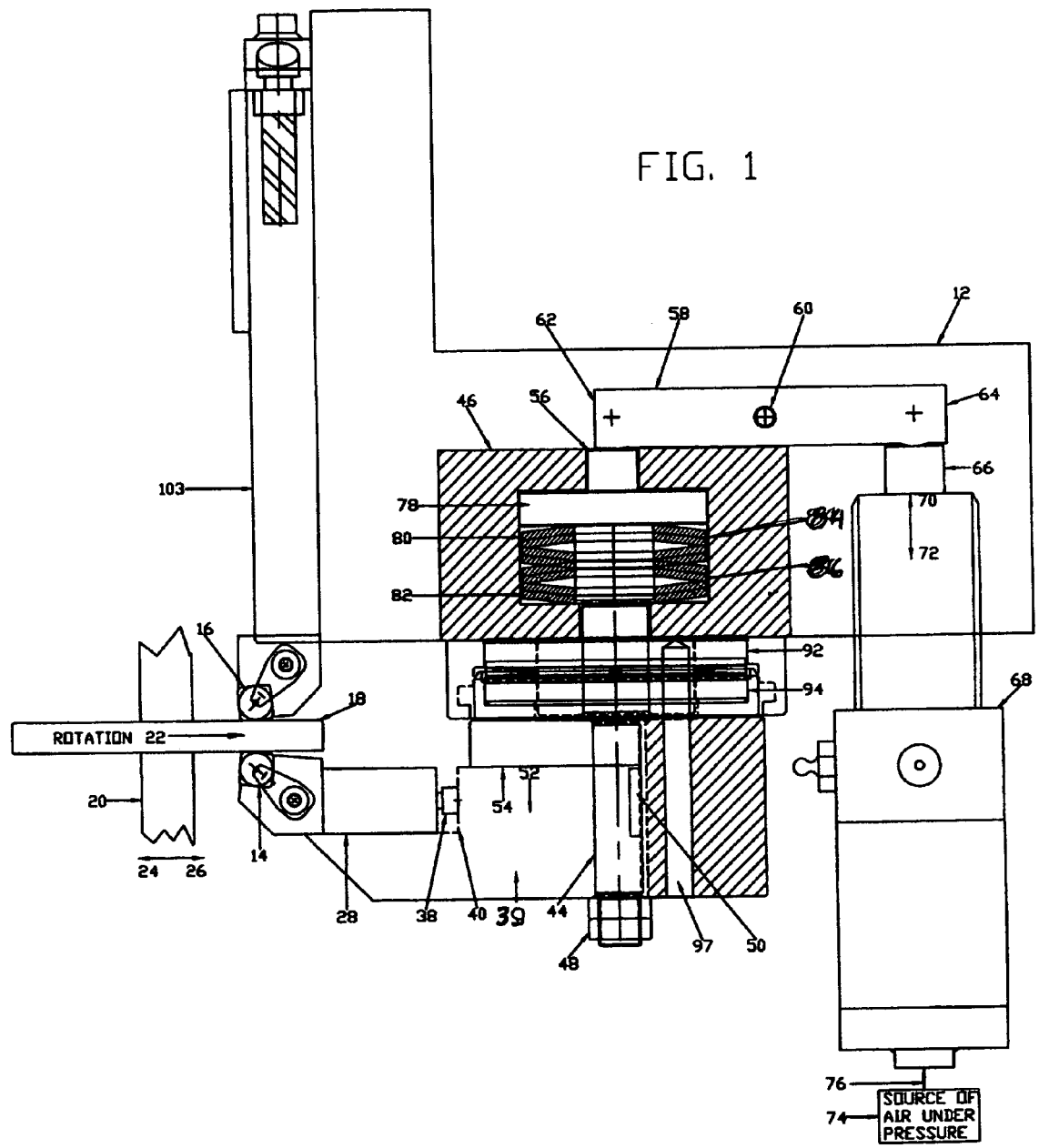
FIG. 1 is a sectional view of a straddle-cutting apparatus illustrating the preferred embodiment of the invention.

Referring to the drawings, FIG. 1 illustrates a preferred straddle-cutting apparatus 10 which comprises a base plate 12 carried on a turret, not shown. A pair of cutting tools 14 and 16 are mounted on the base plate, on opposite sides of the cutting position of a metal workpiece 18 having parallel surfaces which are to be machined. Power means, not shown, rotates the workpiece on a spindle 20 in one direction of arrow 22. The two cutting tools are advanced over the workpiece in the direction of arrow 24 for material removal and then returned to their initial position (home) in the direction of arrow 26.

Figure 4:
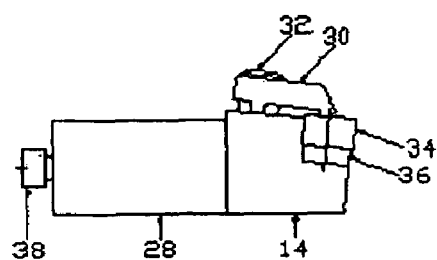
FIG. 4 is a view of a typical tool holder.

Lower cutting tool 14 is illustrated in FIG. 4. The upper cutting tool 16 is similar to cutting tool 14. Cutting tool 14 comprises a tool holder 28 mounted on the base plate, and a clamp 30 connected by fastener means 32 to the tool holder. Clamp 30 locks a cutting insert 34 in a recess in the tool holder. The tool holder 28 has an adjusting screw 38.

Referring to FIG. 1, tool holder 28 is slidably mounted on lower jaw 39. Adjusting screw 38 engages an abutment 40 on lower jaw 39 to adjust the position of the tool holder in a direction parallel to the surface of the workpiece, and with respect to upper cutting tool 16. Lower jaw 39 is slidably mounted on base plate 12 for motion perpendicular to the face of the workpiece.

A shaft 44 is mounted in a housing 46 that is attached to the base plate. The lower threaded end of the shaft is connected to the housing by a nut 48. A key 50 locks the shaft to the lower jaw so that the shaft can be moved up and down with the lower jaw in the direction of arrows 52 and 54. The upper end 56 of the shaft extends above housing 46.

Figure 2:
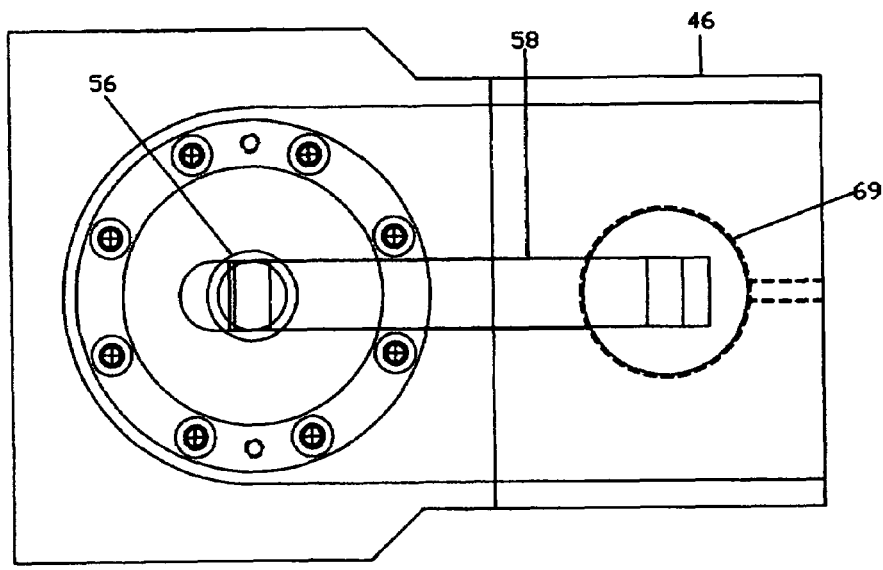
FIG. 2 is a top view showing the lever.

Referring to FIGS. 1 and 2, a first class lever 58 is supported by a pivot pin 60 (fulcrum) so that the lever can pivot around the pivot pin with one lever end 62 engaging the upper end of the shaft. The opposite end 64 of the lever engages a piston rod 66 which forms a part of a pneumatic power cylinder 68. Power cylinder 68 is mounted in an opening 69 in the housing and is adapted to extend or retract piston rod 66 in either an upper direction 70 to push lever 62 away from the cylinder, or in a lower direction 72 to permit lever end 64 to move toward the cylinder.

The arrangement is such that when the piston rod is extended, the lever pushes shaft 44 downwardly together with the lower jaw. When the piston rod is retracted, the lever then permits shaft 44 to slide upwardly in the direction of arrow 54. Power cylinder 68 is connected to a source of air under pressure 74 through a conduit 76.

When the piston rod is extended from the power cylinder, shaft 64 moves down, as viewed in FIG. 1, and carries cutting tool 14 away from cutting tool 16 to open the gap between the two tools.

Figure 3:
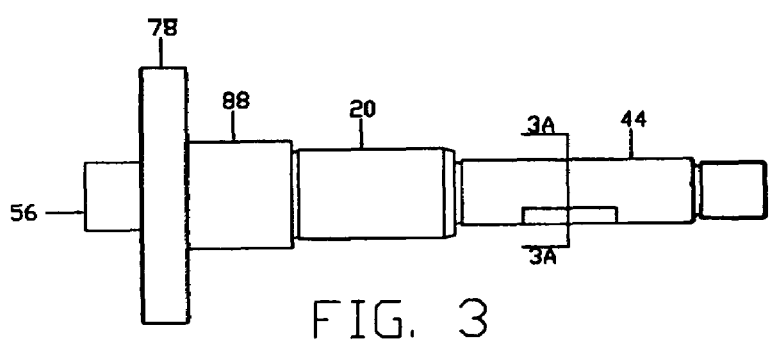
FIG. 3 is a view of the shaft separated from the remainder of the device.
Figure 3A:
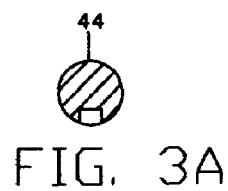
FIG. 3A is a sectional view as seen along lines 3A—3A of FIG. 3.

Referring to FIG. 3, shaft 44 has an integral annular plate 78 disposed in chamber 80 in the housing. The plate moves up and down with the shaft. Chamber 80 has a lower annular abutment 82. Two sets of spring washers, preferably Belleville washers 84 and 86, are mounted in the chamber around an enlarged portion 88 of the shaft. Each set of Belleville washers comprise a pair of washers mounted edge-to-edge, and back-to-back with a companion pair of washers. The stack of Belleville washers opposes the downward axial pressure of the lever on shaft end 56 separating the lower cutting tool from the upper cutting tool. When piston rod 66 is retracted, the Belleville washers bias the shaft together with lower jaw 42 upwardly, thereby re-engaging the lower cutting tool with the upper cutting tool.

The linear motion of piston rod 66, shaft 44 and cutting tool 14 are all perpendicular to the lower face of workpiece 18. The range of motion of the shaft is in the nature of millimeters so that the Belleville washers provide a sufficient force for raising the lever a very small distance.

The number of Belleville washers employed depends upon the particular application to which the apparatus is being used. The Belleville washers may provide a force of 1600 pounds on the shaft.

Figure 5:
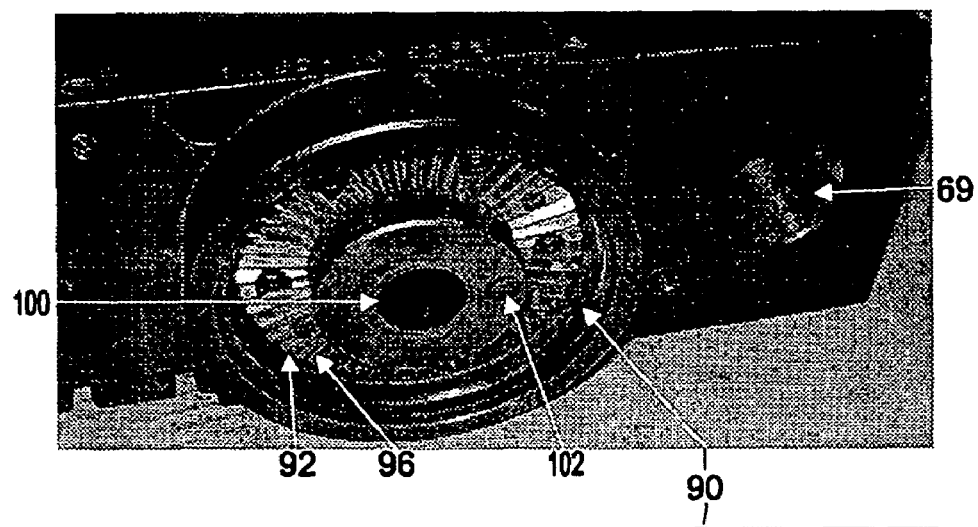
FIG. 5 is a view of the two major components of a positive locking coupling (PLC) separated, one from the other.
Figure 5:
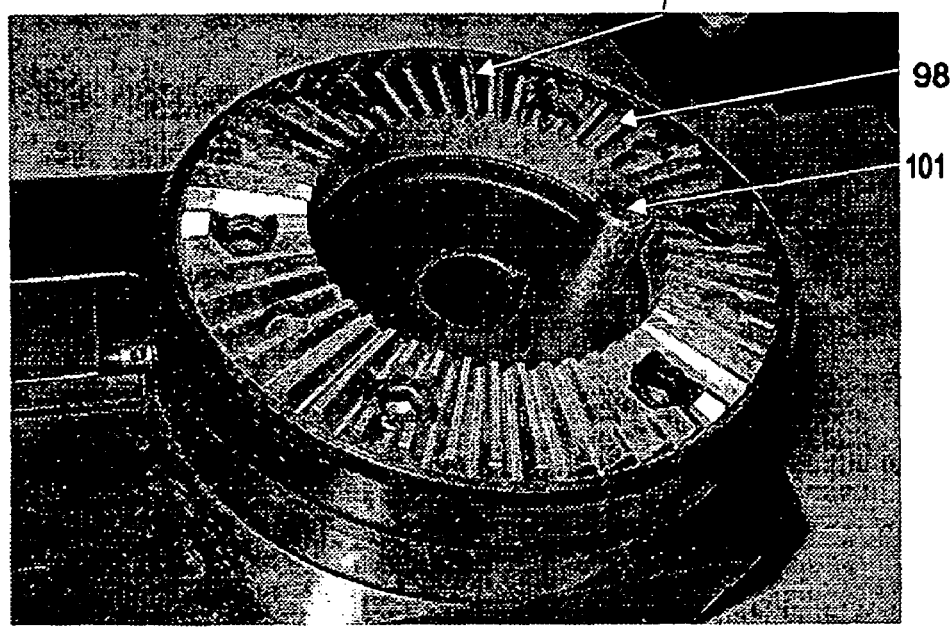

In some cases, the shaft may tend to drift from its desired rotated position. Referring to FIGS. 1 and 5, a positive locking coupling 90 returns the shaft to its initial position when the shaft is released from the downward pressure of the lever. As is well known, a positive locking coupling comprises two coupling components 92 and 94, having an annular array of teeth 96 and 98. Coupling component 92 has a central opening 100 that suitably receives shaft 44. Coupling component 92 is attached to the housing by suitable fasteners, not shown.

Coupling component 94 is attached to the shaft to move as a unit with the shaft and the lower jaw when the piston rod is extended, to separate teeth 98 from teeth 96. When the piston rod is retracted, the shaft then rises with coupling component 94 to mesh teeth 98 with teeth 96 to return the shaft to its original rotated position.

A pin 101 is mounted in the housing and received in an opening 102 in coupling component 92. The pin limits any swinging or rotating of coupling component 94.

Upper cutting tool is mounted on an upper jaw 103 and attached to a turret, not shown, in such a manner that the turret moves the upper cutting tool toward or away from the upper face of the workpiece during the course of a machining cycle.

In use, the gap between cutting tool 14 and cutting tool 16 is adjusted to take a certain amount of material from either or both the upper face and the lower face of the workpiece. Cutting tool 14 can remove a certain depth of material on the lower face of the workpiece, while upper cutting tool removes a different amount of material from the opposite face.

The user then rotates the workpiece and advances the straddle-cutter in the direction of arrow 24 to a final cutting position on the workpiece. When the machining has been completed, the straddle-cutter opens and is returned to its initial (home) position in the direction of arrow 26.

I claim:

1. Apparatus for machining parallel surfaces on a rotating workpiece, comprising:
    a metal-cutting tool, and means including a jaw for advancing the metal-cutting tool toward a material-removal position of a workpiece;
    a base;
    a shaft mounted on the base for axial motion;
    a power cylinder mounted on the base, the power cylinder having a movable piston rod;
    a fulcrum mounted on the base;
    a lever mounted on the fulcrum and engageable with the shaft for moving the shaft in a first axial direction, the lever being engageable with the piston rod to be pivoted about said fulcrum as the piston rod is moved in a power stroke;
    a spring washer having a central opening supported on said shaft to bias the shaft in an opposite axial direction; and
    structure connecting the shaft to the metal-cutting tool to move same away from the material-removal position, against the bias of the spring washer as the lever moves said shaft in said first axial direction.

2. Apparatus as defined in claim 1, including a second metal-cutting tool mounted on the base for engaging a second, parallel side of the workpiece as the metal-cutting tool is advanced in a machining direction.

3. Apparatus as defined in claim 2, including means for moving the second metal-cutting tool toward the workpiece for engaging the workpiece for removing metal.

4. Apparatus as defined in claim 1, including a positive locking coupling having a first coupling component connected to the base, and a second cooperating coupling component connected to said jaw to engage the first coupling component to align the angular position of the jaw in said opposite direction.

5. Apparatus as defined in claim 4, in which the first coupling component has an annular array of teeth, and the second coupling component has an annular array of teeth which mesh with the teeth on the first coupling component.

6. Apparatus as defined in claim 1, in which the power cylinder is a pneumatically-operated power cylinder.

7. Apparatus as defined in claim 1, in which the lever is mounted on the fulcrum as a first class lever.

8. Apparatus for machining parallel surfaces on a rotating workpiece, comprising:
- a rotating workpiece support;
- a metal-cutting tool, and means for advancing the metal-cutting tool along a line of motion perpendicular to a face of a workpiece chucked in said rotating workpiece support, comprising:
- a base;
- a shaft mounted on the base for axial motion;
- a power cylinder having a movable piston rod;
- a fulcrum mounted the base;
- a lever mounted on the fulcrum and having a first end engageable with the shaft to move the shaft in a first axial direction, the lever having a second end engageable with the piston rod of the power cylinder to pivot about said fulcrum as the piston rod is being moved in a power stroke;
- a plurality of spring washers supported on said shaft to bias the shaft in an opposite axial direction; and
- structure connecting the shaft to the metal-cutting tool to move same toward a workpiece as the lever moves said shaft in said first axial direction.

9. Apparatus for machining parallel surfaces on a rotating workpiece, comprising:
- a metal-cutting tool support;
- a rotating workpiece support, and means for advancing the metal-cutting tool support toward a workpiece in a workpiece-cutting motion;
- a base;
- a shaft mounted on the base for axial motion;
- a power cylinder having a movable piston rod connected to the shaft to move the shaft in said axial motion in a first axial direction;
- a stack of spring washers engaging the shaft to bias the shaft in an opposite axial direction; and
- a jaw connecting the shaft to the metal-cutting tool to move same either toward or away from a workpiece cutting position as the shaft is moved in either said first axial direction or said opposite axial direction.

10. Apparatus as defined in claim 8, in which the spring washers are Belleville washers.

* * * * *